July 23, 1935. L. HIRSCHHORN ET AL 2,008,826
COMBINATION BAG TRANSFER AND FILLING MECHANISM
Filed June 18, 1932  9 Sheets-Sheet 4
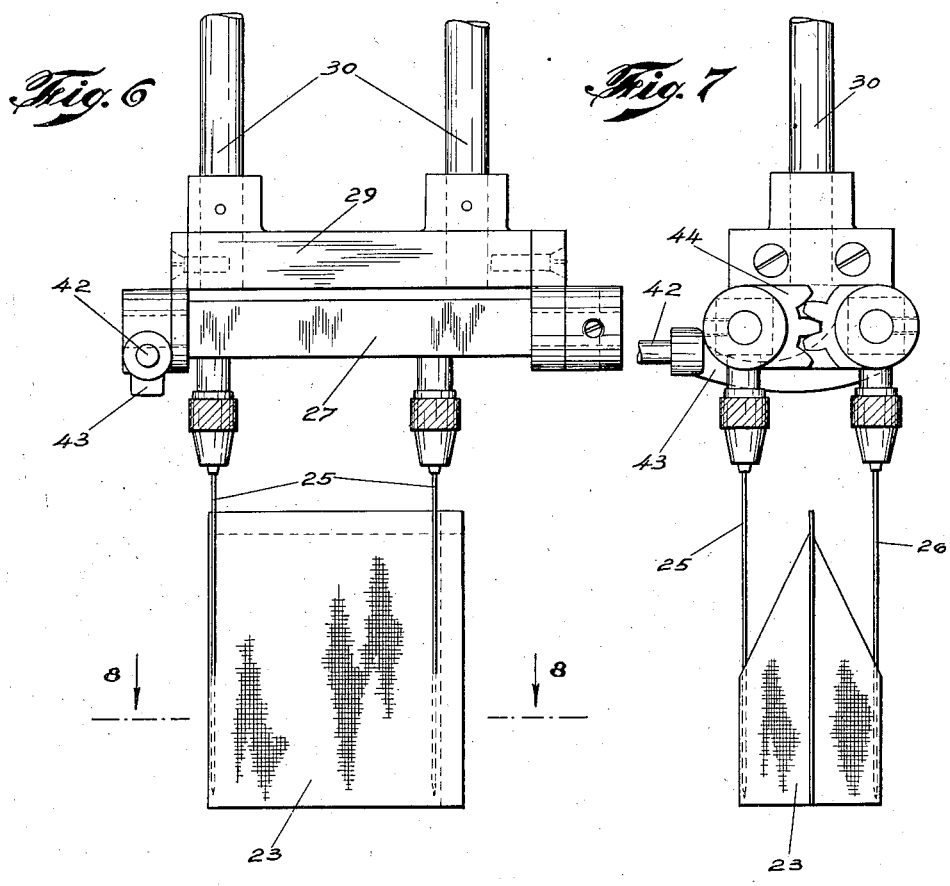
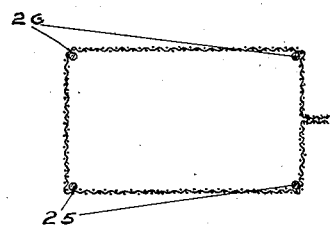
INVENTORS
LOUIS HIRSCHHORN AND HANS IRMSCHER
BY
ATTORNEYS July 23, 1935. L. HIRSCHHORN ET AL 2,008,826
COMBINATION BAG TRANSFER AND FILLING MECHANISM
Filed June 18, 1932 9 Sheets-Sheet 5
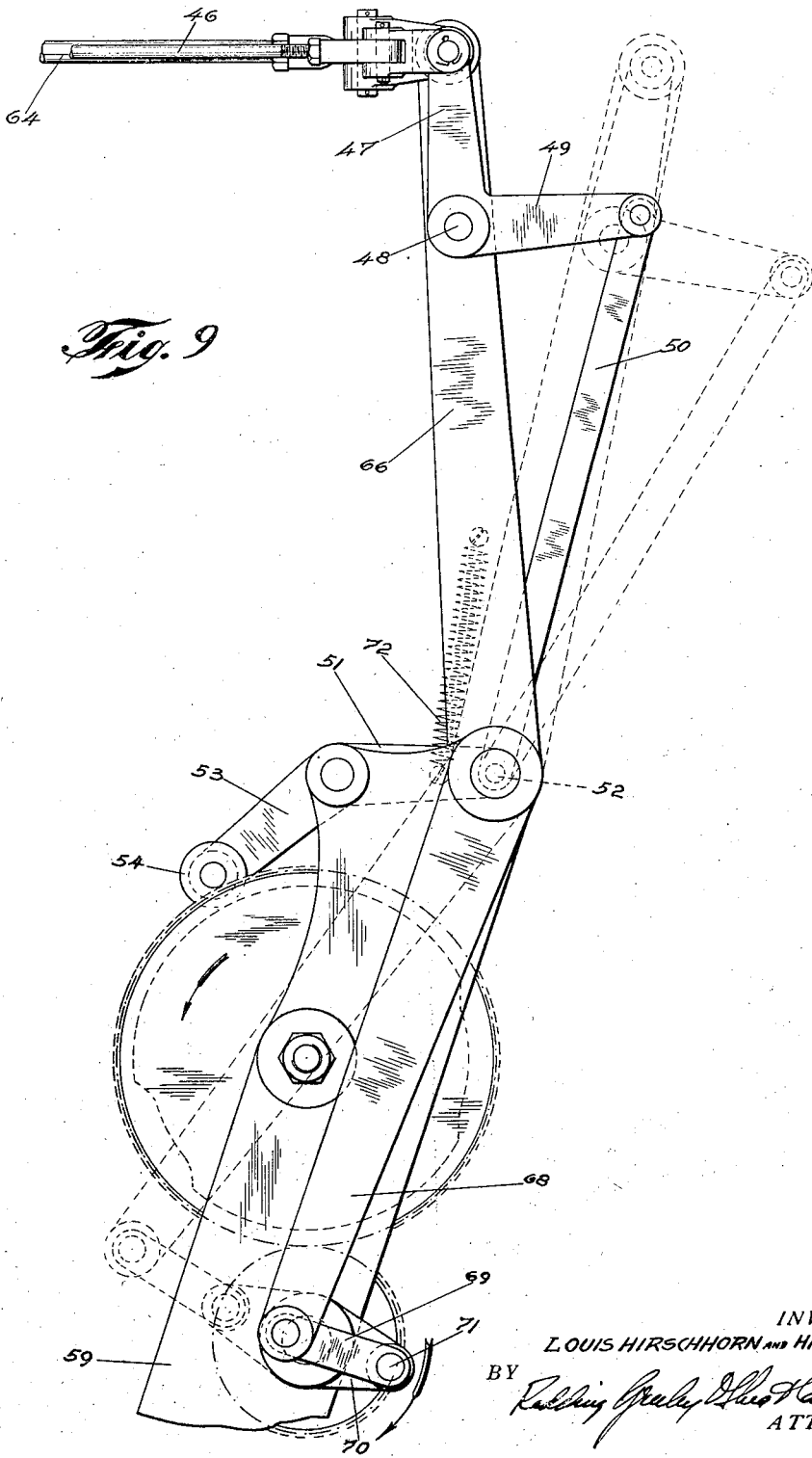
INVENTORS
LOUIS HIRSCHHORN AND HANS IRMSCHER
BY
ATTORNEYS

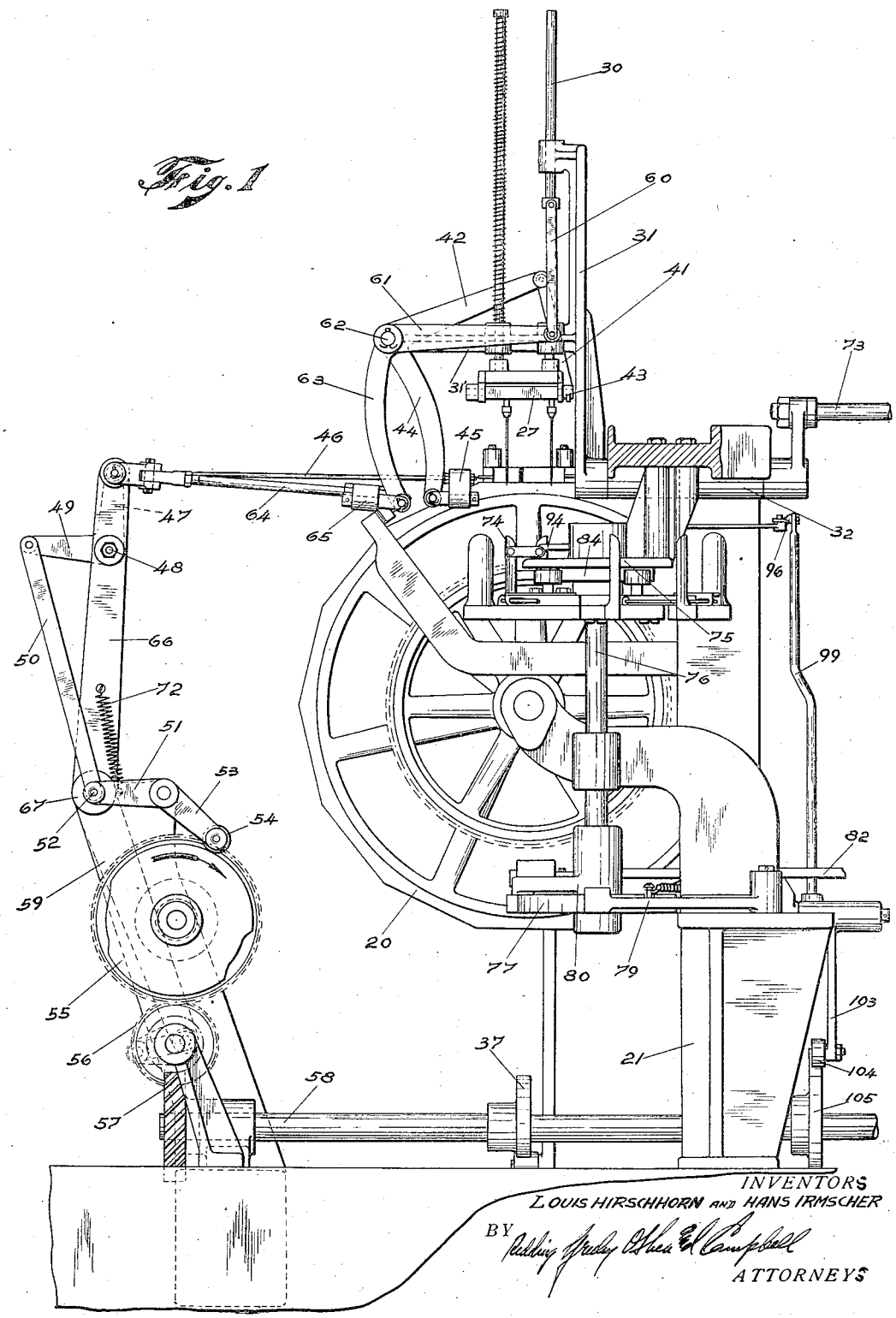

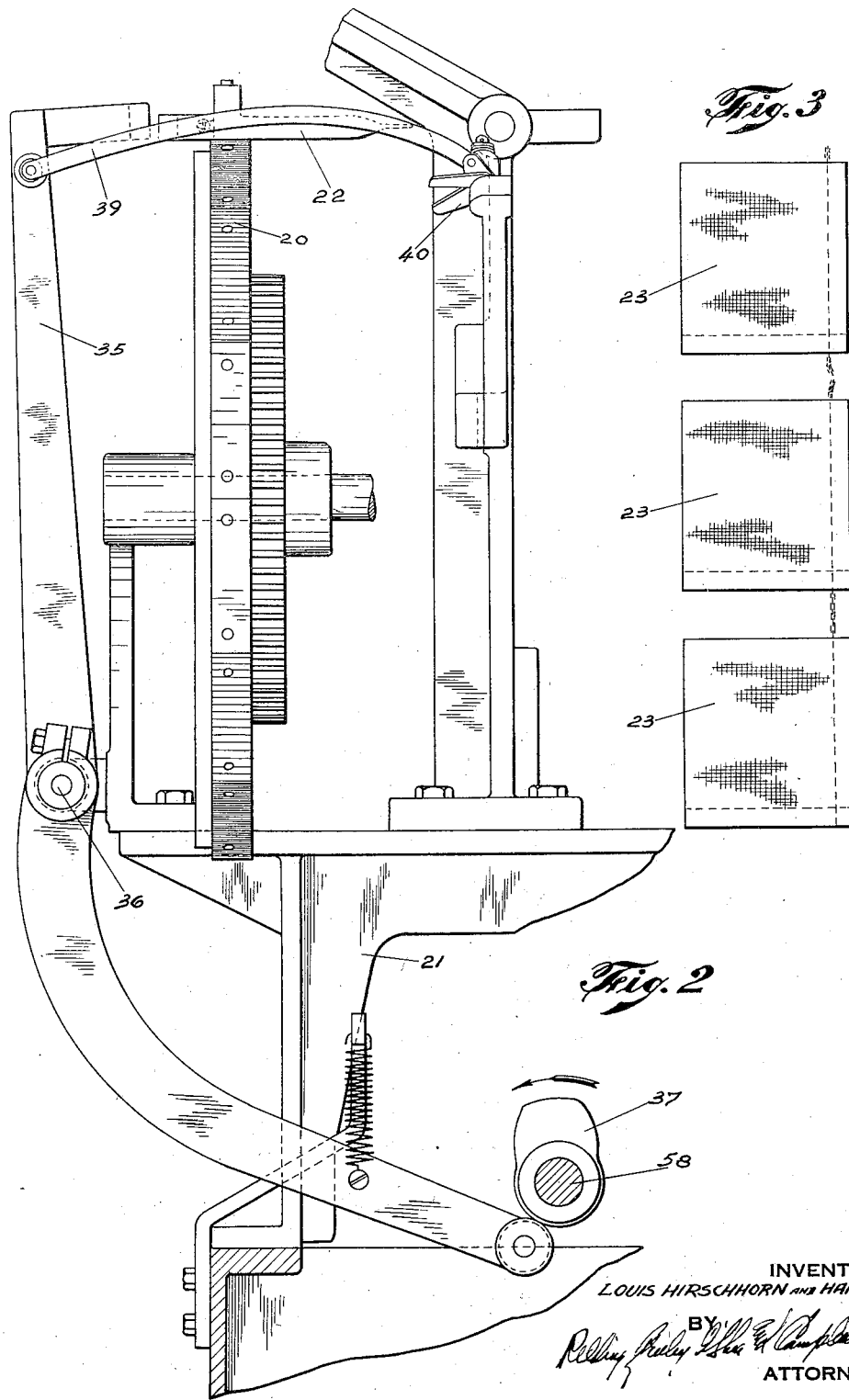

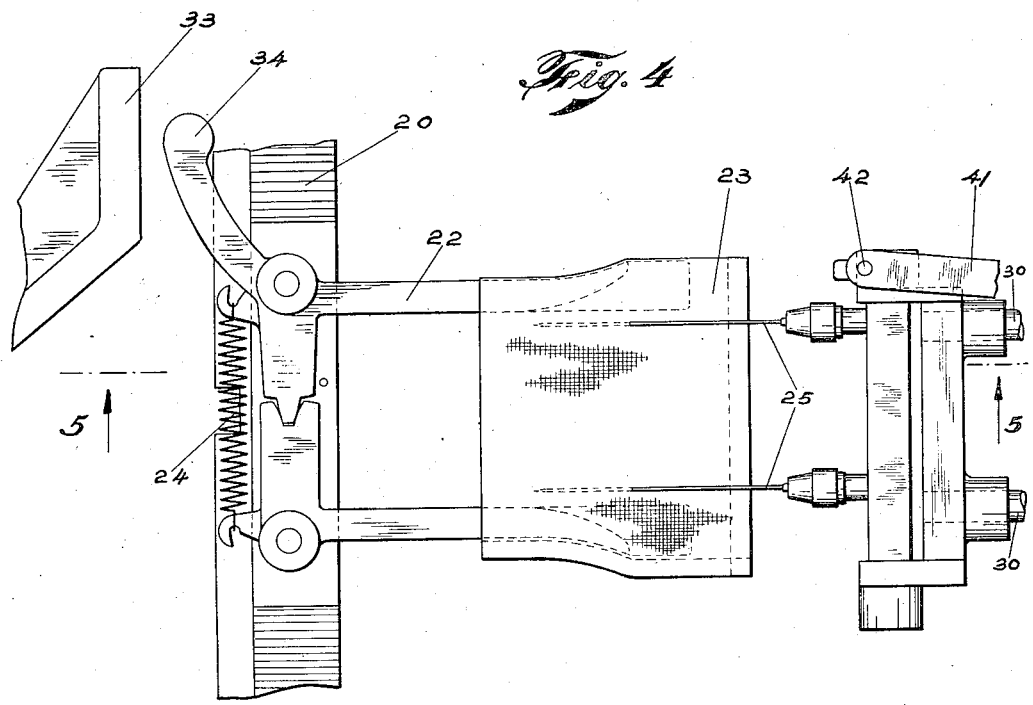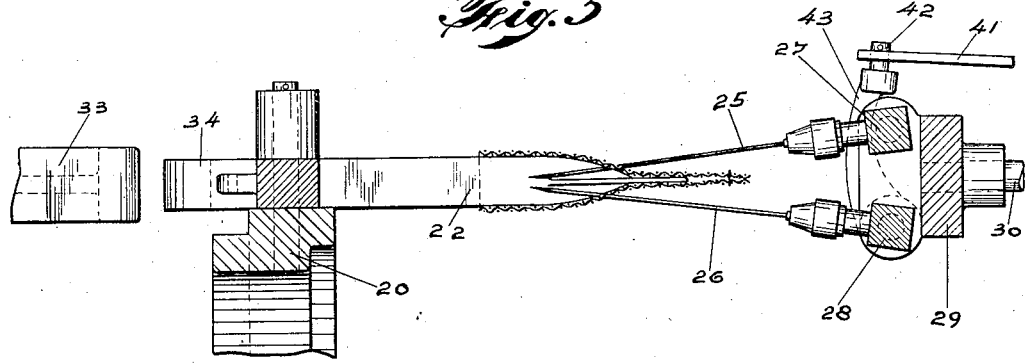

INVENTORS
LOUIS HIRSCHHORN AND HANS IRMSCHER
ATTORNEYS

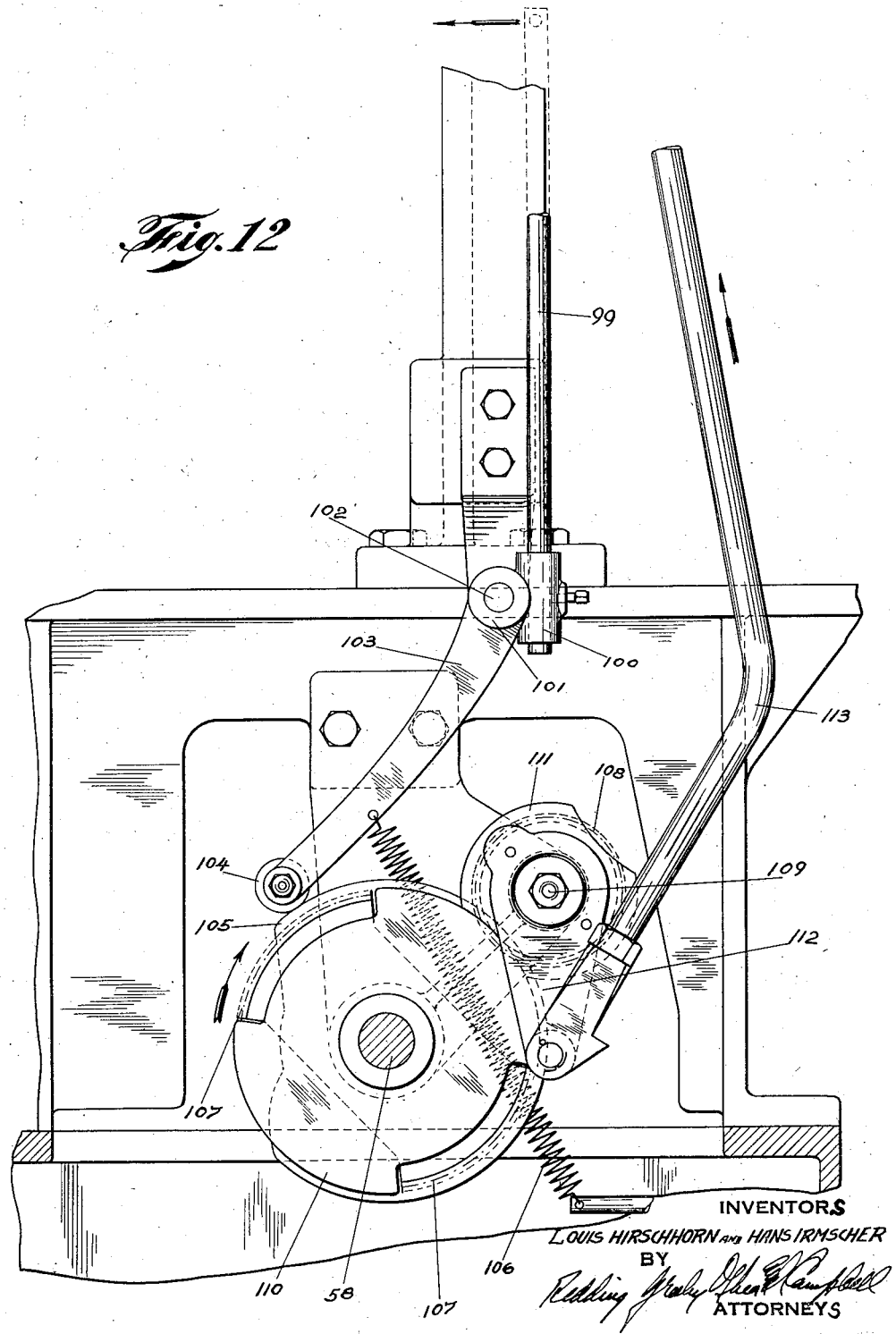

July 23, 1935.  L. HIRSCHHORN ET AL  2,008,826
COMBINATION BAG TRANSFER AND FILLING MECHANISM
Filed June 18, 1932   9 Sheets-Sheet 8
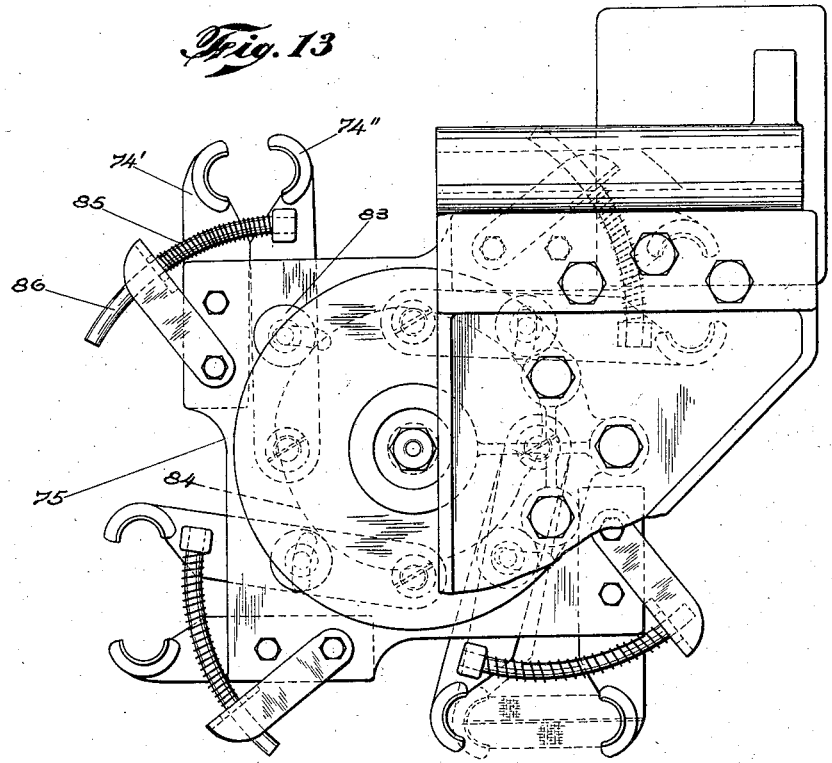
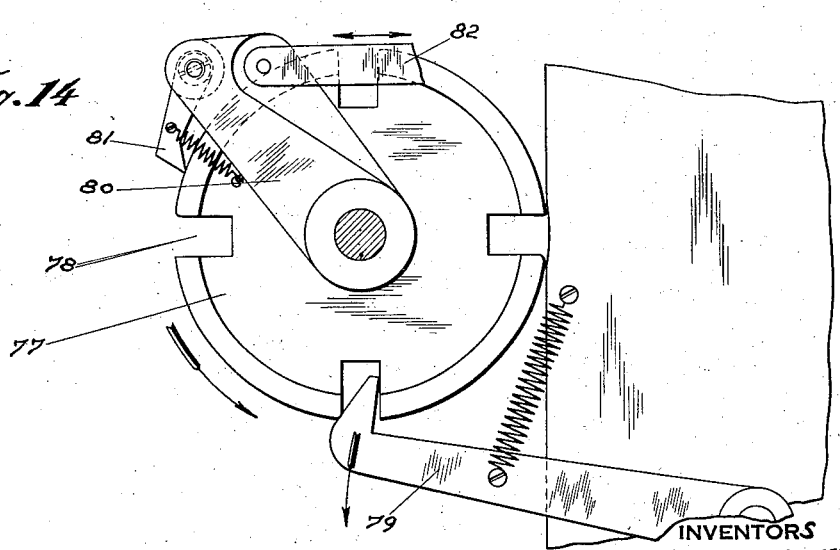
INVENTORS
LOUIS HIRSCHHORN AND HANS IRMSCHER
BY
ATTORNEYS

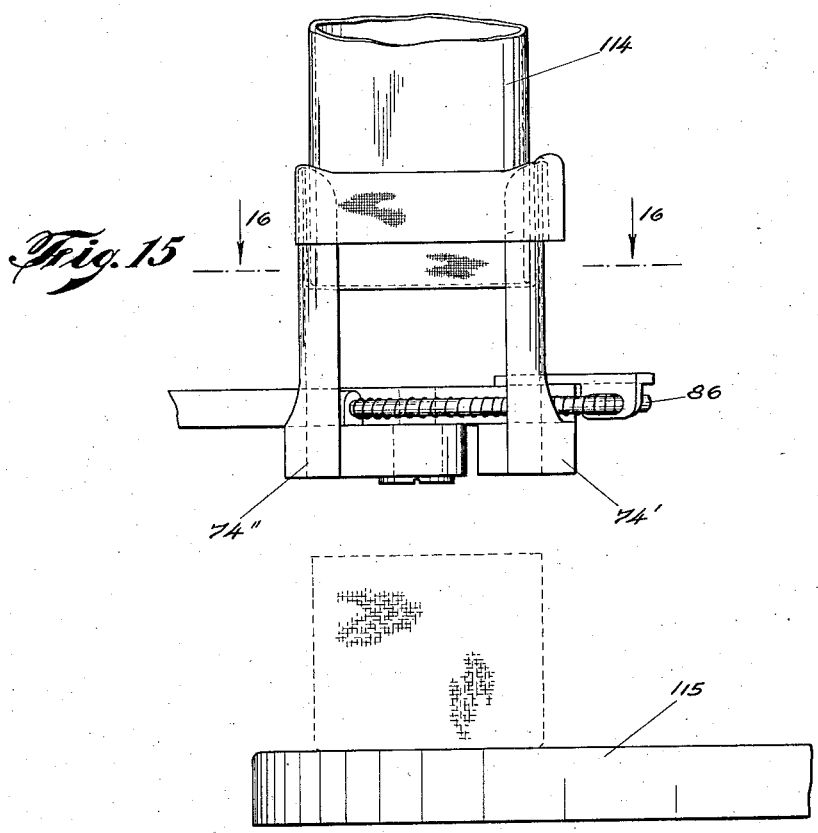
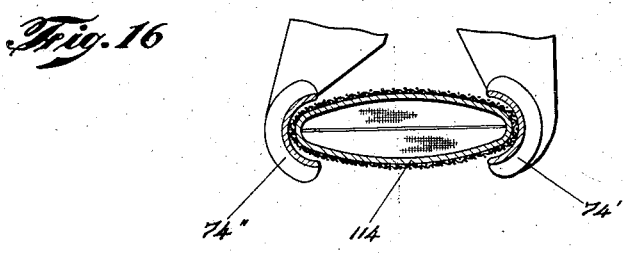

Patented July 23, 1935

2,008,826

UNITED STATES PATENT OFFICE 2,008,826

COMBINATION BAG TRANSFER AND FILLING MECHANISM

Louis Hirschhorn and Hans Irmscher, New York, N. Y., assignors to Millie Patent Holding Co. Inc., New York, N. Y., a corporation of New York Application June 18, 1932, Serial No. 617,956

11 Claims. (Cl. 226—47)

The present invention relates to devices for forming and filling receptacles with desired substances and embodies, more specifically, an improved mechanism for manipulating receptacles which have been formed in a desired fashion in order that the receptacles may be properly positioned and filled preparatory to being treated in any desired fashion.

More particularly, the invention embodies an improved device for handling receptacles which have been formed of a porous or perforated structure in order that such receptacles may be directed from a device for supplying the receptacles continuously to a mechanism for properly positioning the receptacles for filling, such mechanism including means for filling the receptacles and directing them to any mechanism for subsequently treating the same.

The art of bagging substances, such as tea, coffee, etc. now includes machines which form bag-like receptacles from a continuous source of material, such machines severing the material and sewing the same into bags having open ends. The prior art further includes transfer mechanism for directing the bag-like receptacles so formed to a filling mechanism, by means of which the receptacles are filled and directed to a device for closing the receptacles subsequent to the filling operation. In the last mentioned operations, viz; those taking place subsequent to the sewing of the material into bag-like receptacles, the existing structures are of such nature as to place considerable strain upon the material from which the bag-like receptacles are formed. Such material must, therefore, necessarily be of fairly good grade in order to withstand the rather severe treatment received during the filling operations and such operations, in existing machines, are accompanied by considerable wastage due to the faulty operation of the elements of the filling and handling mechanism.

With a view to providing a bag or receptacle transfer and filling mechanism wherein the bags are handled accurately and yet without undue strains imposed thereon, the present invention has been designed and an object thereof is to provide a bag transfer and filling mechanism by means of which bags may be directed from a means for supplying the same continuously to a positioning and filling mechanism, such means functioning positively and accurately and yet in a manner such that excessive strain is not placed upon the material from which the bag or receptacle is formed.

A further object of the invention is to provide an improved transfer and filling mechanism by means of which a bag-like receptacle may be taken from a device for supplying receptacles continuously and placed upon an inverting and filling mechanism in such fashion that, throughout the handling of the bag, positive stresses may be placed thereon uniformly along extended areas thereof, the unit stresses so imposed being within predetermined limits.

Further objects, not specifically enumerated above, will be apparent as the invention is described in greater detail in connection with the accompanying drawings, wherein:

Figure 1 is a view in front elevation, showing a bag transfer mechanism constructed in accordance with the present invention.

Figure 2 is a detail view in side elevation showing a device for cutting the stitches between successively sewed bags preparatory to transferring the bags to a filling mechanism.

Figure 3 is a plan view showing successively sewed bags in the position which they assume in passing by the cutting mechanism, the stitches between the upper and intermediate bags being illustrated as having been severed by the cutting mechanism.

Figure 4 is a detail plan view showing a portion of the bag transfer mechanism by means of which bags are removed from the supporting arms which direct them through the sewing and cutting mechanisms, by means of which the bags are formed, and direct the bags from such arms to a device for turning the same inside out and filling them.

Figure 5 is a view in section, taken on line 5—5 of Figure 4, and looking in the direction of the arrows.

Figure 6 is a plan view of the bag transfer elements shown in Figure 4, such view showing the bag as having been removed from its supporting arm.

Figure 7 is a view in side elevation, showing the elements of Figure 6.

Figure 8 is a view in section, taken on line 8—8 of Figure 6, and looking in the direction of the arrows.

Figure 9 is a detail view showing the mechanism for operating the transfer elements shown in Figures 4, 5, 6, and 7.

Figure 12 is a detail view showing the operating mechanism for the bag transfer and gripping elements shown in Figures 10 and 11.

Figure 13 is a plan view of the bag transfer mechanism shown in Figures 10, 11, and 12, this view illustrating the entire table and bag supporting structure thereof.

Figure 14 is a detail view showing the means for actuating the bag transfer elements of Figure 13, this view also showing the means for controlling the step by step movement thereof.

Figure 15 is a detail view in elevation, showing the manner in which bags mounted upon the transfer mechanism of Figures 10 through 13 are turned inside out and filled.

Figure 16 is a view in section, taken on line 16—16 of Figure 15, and looking in the direction of the arrows.

Figure 10:
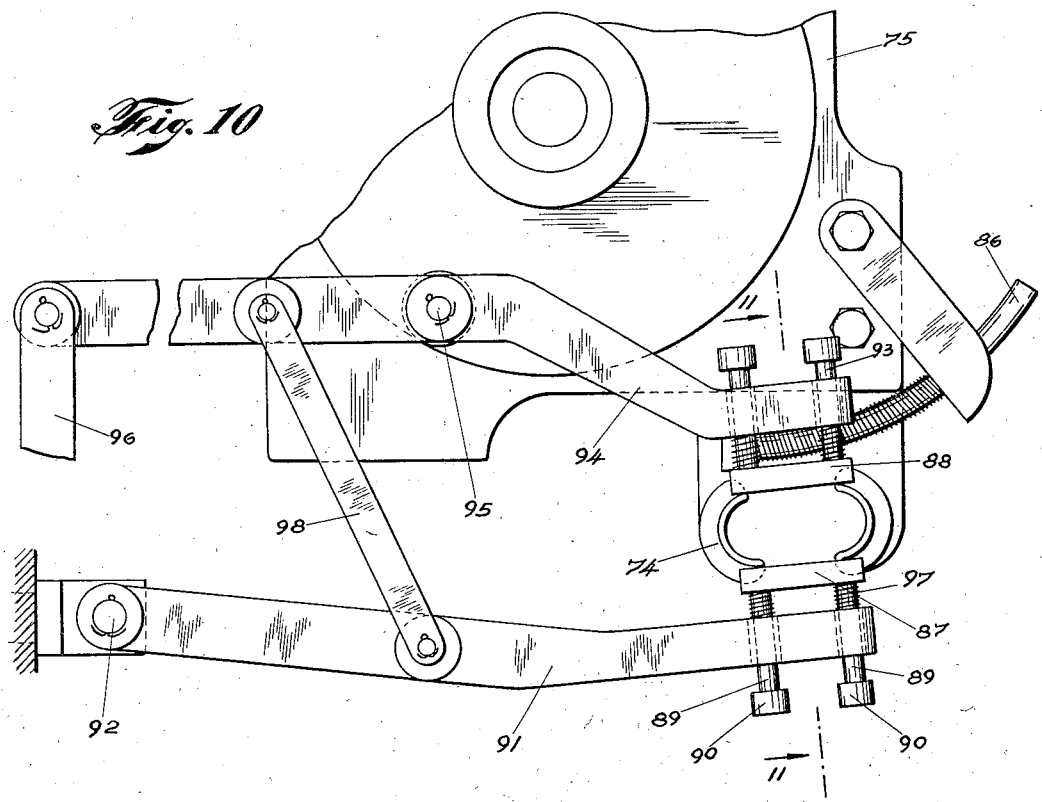
Figure 10 is a segmental plan view showing additional elements of the bag transfer mechanism of the present invention, this view illustrating the supporting members over which the bag is drawn by the transfer elements shown in Figures 4, 5, 6, and 7, the gripping mechanism for the bags upon such elements also being illustrated.

With reference to the above drawings and particularly to Figures 1, 2, and 3, the present invention will be seen to include a wheel 20 which is mounted upon a frame 21 and which carries a plurality of pairs of arms 22 over which lengths of material are mounted to be sewed into successive bag-like receptacles as illustrated in Figure 3. Inasmuch as the sewing operation constitutes no part of the present invention a detailed description of the sewing mechanism is unnecessary herein.

Figures 4, 5, 6, 7, and 8 illustrate a mechanism for removing bags from the pairs of arms 22 in order that they may be directed to a mechanism to be described in detail hereinafter. As seen in Figure 4, a bag-like receptacle 23 is mounted upon the arms 22, the latter being of such construction as to separate the sides of the bag and tension the same to a desired extent as seen in Figure 5. The tensioning may be accomplished by means of a spring 24 to facilitate the engagement of the bag by a plurality of pairs of needles 25 and 26. Needles 25 are mounted upon a shaft 27 while needles 26 are secured to a shaft 28. Shafts 27 and 28 are mounted upon a head 29 which is secured to guide rods 30 which are slidably mounted in a frame 31 (Figure 1) which is journaled in a bearing 32, formed upon the frame 21.

Upon movement of the needles 25 and 26 into engagement with the bag 23, as shown in Figures 4 and 5, the tension placed upon the bag by the arms 22 is relieved by an arm 33 which engages an extension 34 formed upon one of the arms 22. Arm 33 is formed upon a lever 35 (Figure 2) which is pivoted at 36 to a stationary part of the frame 21 and is actuated by a cam 37, mounted upon a driving shaft 58 of the machine. Lever 35 is also provided with a link 39 which actuates a cutting mechanism 40 to sever the stitches between successively sewed bags upon the wheel 20, as illustrated in Figure 3.

The movement of needles 25 and 26 with respect to each other is controlled by a link 41 which is pivotally connected at 42 to an arm 43 which is secured to shaft 28. Segmental gears 44 are secured to the shafts 27 and 28 and thus movement of link 41 in a given direction causes the pairs of needles 25 and 26 to be moved either toward each other or to be separated. When the needles move into the bag 23, link 41 is so controlled that the needles are moved together ultimately to assume the position shown in Figure 5. Subsequent actuation of link 41 causes the needles to be separated, as viewed in Figure 7, and the sides of the bag are spaced apart as illustrated in Figures 7 and 8.

Link 41 (Figure 1) is connected to a bell crank lever 42 which is journaled upon an arm 31′, formed upon the frame 31. Another arm 44 of the bell crank lever 42 is connected through a universal connection 45 to a link 46 which is pivoted to an arm 47 of a bell crank lever pivoted at 48. Another arm 49 of the bell crank lever is connected to a link 50 which is pivoted to an arm 51 at 52. Arm 51 is actuated by an arm 53 which is provided with a roller 54 adapted to engage the periphery of an operating cam 55. Rotation of the operating cam in the direction illustrated by the arrow in Figure 1 may be effected by means of a gear 56 which is driven by a worm and worm wheel connection 57, driven by a main power shaft 58. The supporting structure for the foregoing elements preferably comprises a frame 59 which is integral with the frame 21.

In order that the head 29 and guide rods 30 may be reciprocated upon the frame 31, a link 60 is secured to one of the guide rods 30 and to an arm 61 of a lever pivoted at 62 upon the arm 43 of the frame 31. Arm 61 is actuated by an arm 63 which is connected to a link 64 through a universal connection 65. Link 64 is pivoted to an arm 66 upon which the pivoted connection 48 for the arms 47 and 48 is made. The lower end of arm 66 is pivoted at 67 upon frame 59, the pivotal connection of 67 being concentric with the pivot 52 in order that arm 66 may be turned upon its pivot 67 without affecting the condition of the actuating mechanism for the needles 25 and 26, as above described. Pivotal movement of arm 66 is effected by means of a lever 68 (Figure 9), this lever being connected to a link 69 which is pivoted to a crank arm 70 at 71. Crank arm 70 is mounted upon the shaft upon which gear 56 is mounted and thus the reciprocation of head 29 and the actuation of needles 25 and 26 are synchronized. A spring 72 may be provided to urge the roller 54 against the periphery of cam 55 in order that proper response may be had at all times to the motion of the cam.

As mentioned above, frame 31 is journaled at 32 in order that it may be properly actuated in accordance with the movement of head 29. The frame, accordingly, swings through an arc of 90°, being in a substantially horizontal position when the needles are advanced into the bag as described in connection with Figures 4 and 5, and in a substantially vertical position when the bag, in the position illustrated in Figures 6, 7, and 8 is moved over the mechanism to be described presently for turning the bag inside out and filling the same. Such motion of the frame is effected by means of an actuating device, such as an arm 73 and the operation is effected without disturbing the operating mechanism for the head and needles by reason of the universal connections 45 and 65.

After the frame has been moved into a vertical position as shown in Figure 1, at which time the needles are in the position illustrated in Figures 6, 7, and 8 and a bag is mounted thereon, the frame 29 and guides 30 are lowered. This moves the bag over a properly positioned pair of fingers 74, as viewed in Figures 1, 10, and 11.

Fingers 74 are mounted upon a horizontal table 75 (Figures 1 and 10) which is secured to a vertical spindle 76. In the mechanism illustrated in the accompanying drawings, four pairs of fingers are mounted upon the table 75 and the table is moved intermittently through 90° by the driving mechanism shown in Figure 14. This mechanism includes a disc 77 having spaced notches 78 formed in the periphery thereof and secured to spindle 76. A spring-pressed locking finger 79 is adapted to engage the notches 78 to hold the disc in a predetermined position during the steps of placing the bag over the fingers and inverting and filling the same. An arm 80 is journaled upon spindle 76 and provided with a spring-pressed pawl 81 which is adapted to engage the notches 78 and move the disc 77 in a step by step fashion in the direction indicated by the arrow of Figure 14. Link 82 is connected to the arm 80 and is reciprocated by a suitable mechanism actuated by the main power shaft 56.

Each pair of fingers 74 includes a stationary finger 74' and a pivoted finger 74''. The pivoted fingers 74'' are each provided with a roller 83 which is adapted to engage upon the periphery of a cam 84 which is secured to the spindle 76 adjacent the table 75. The cam 84 is so formed as to move the pivoted fingers 74'' into the various positions shown in Figure 13, during the proper cycles of operation. For example, the upper left hand pair of fingers (as viewed in Figure 13) are shown as moved in close proximity in order that the bag may be drawn thereover to the position indicated in Figure 11. When the fingers reach a position under the filling mechanism described hereinafter, the cam causes the pivoted finger of the corresponding pair of fingers to move away from the stationary finger as indicated in the lower right hand portion of Figure 13. Such motion is accomplished by means of a spring 85 and a guide rod 86.

Figure 11:
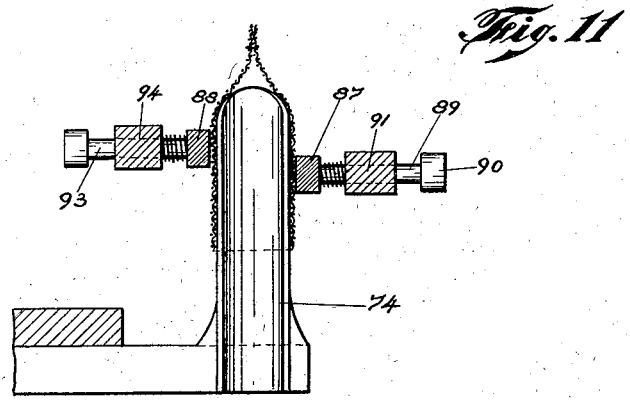
Figure 11 is a view in section, taken on line 11—11 of Figure 10 and looking in the direction of the arrows.

After the bags have been placed over the supporting fingers, the head 29 and needles 25 and 26 are elevated in order that the bags may rest freely upon the supporting fingers. To prevent the bags from following the needles upwardly, presser feet 87 and 88 are provided, engaging the sides of the bags 23 as illustrated in Figures 10 and 11. Presser foot 87 is mounted upon a pair of rods 89 having limiting heads 90 which are slidably supported in an arm 91 which is pivoted at 92 to a stationary portion of the machine. Presser foot 88 is mounted upon a plurality of rods 93 which are slidably mounted in an arm 94, pivoted at 95 upon a stationary portion of the machine and actuated by a reciprocable link 96 which is pivotally connected to the end of arm 94. Springs 97 normally urge the presser feet 87 and 88 outwardly into engagement with the sides of bags 23 and the movement of arms 91 and 94 is synchronized by means of a link 98 which is pivotally connected between the arms.

Link 96 is pivoted to the end of an arm 99 which is secured to a sleeve 100, formed upon a bracket 101 which is pivoted at 102 to the frame of the machine. Bracket 101 is formed with an arm 103 which is provided with a roller 104 upon the end thereof, this roller being adapted to engage the periphery of a cam 105, being urged thereagainst by means of a spring 106. Mounted to rotate with cam 105 are gear segments 107 which are adapted to engage a mutilated gear 108 mounted upon a shaft 109. Locking cam segments 110 rotate with gear segments 107 and are adapted to engage a cooperating cam segment 111 which rotates with the mutilated gear 108. In this fashion, shaft 109 is intermittently rotated and thus rotates, in a step by step fashion, a crank arm 112 to which a link 113 is connected. Link 113 actuates arm 73 to move the frame 31 from a horizontal to a vertical position in accordance with the operation outlined hereinbefore.

After the bags have been placed over the supporting fingers 74 as illustrated in Figure 11, the table 75 is rotated to bring the bag and supporting fingers under a reciprocating spout 114. The position of the fingers and bag under the spout is shown in Figure 15 and after the fingers are properly positioned beneath the spout the spout descends, drawing the upper portion of the bag downwardly between the supporting fingers to turn the bag inside out and simultaneously fill the same with a desired quantity of substance. After the bag has been inverted and filled it is received upon a table 115 from which it may be removed in any desired fashion.

It will thus be seen that a mechanism has been provided which operates positively and effectively to transfer bags from a bag supplying member to supporting fingers upon which the bags are inverted and filled with a desired substance. By controlling the movements of the bags in the manner outlined herein, no deleterious stresses are impressed upon the fabric of the bags and a very cheap material may thus be used in making the same. The effective manner in which the bags are manipulated insures accurate functioning of the machine with no faulty operations.

While the invention has been described with specific reference to the accompanying drawings, it is not to be limited, save as defined in the appended claims.

We claim as our invention:

1. Means for supplying bag-like receptacles, holding means therefor, a frame for transferring the receptacles from the supplying means to the holding means, a plurality of bag engaging means on the frame, means for moving the bag engaging means with respect to each other, means for moving the bag engaging means bodily with respect to the frame, and means to move the frame with respect to the supplying and holding means.

2. Means for supplying bag-like receptacles, holding means therefor, a frame for transferring the receptacles from the supplying means to the holding means, a plurality of bag engaging means on the frame, means for moving the bag engaging means with respect to each other, means for moving the bag engaging means bodily with respect to the frame, and means to move the frame into axial alignment with the supplying and holding means.

3. Means for supplying bag-like receptacles, holding means therefor, a frame for transferring the receptacles from the supplying means to the holding means, a plurality of bag engaging means on the frame, means for moving the bag engaging means with respect to each other, means for moving the bag engaging means bodily with respect to the frame, means to pivot the frame for swinging movement and means to swing the frame into axial alignment with the supplying and holding means.

4. Means for supplying bag-like receptacles, holding means therefor, a frame for transferring the receptacles from the supplying means to the holding means, a head slidably mounted on the frame, shafts journaled on the head, a plurality of needles on each shaft, interconnections between the shafts whereby the needles are swung toward and from each other, means to actuate one of the shafts, and means to swing the frame into alinement with the supplying means for engagement of the needles with the receptacle when the head is moved toward the supplying means and into alinement with the holding means when the head is moved toward the holding means.

5. Means for supplying bag-like receptacles, holding means therefor, a frame for transferring the receptacles from the supplying means to the holding means, means to swing the frame into alignment with the supplying and holding means, a head slidably mounted on the frame, shafts journaled on the head, a plurality of needles on each shaft, and means to turn the shafts to swing the needles together upon movement of the head toward the supplying means and to swing the needles apart upon movement of the head away from the supplying means.

6. Means for supplying bag-like receptacles, holding means therefor, a frame for transferring the receptacles from the supplying means to the holding means, means to swing the frame into alignment with the supplying and holding means, a head slidably mounted on the frame, shafts journaled on the head, a plurality of needles on each shaft, means to reciprocate the head, and means on the last named means to turn the shafts to swing the needles together upon movement of the head toward the supplying means and to swing the needles apart upon movement of the head away from the supplying means.

7. Means for supplying bag-like receptacles comprising a pair of pivoted arms normally urged apart and adapted to have bag-like receptacles drawn thereover, holding means for the receptacles, a frame for transferring the receptacles from the supplying means to the holding means, a plurality of bag engaging means on the frame, means for moving the bag engaging means with respect to each other, means for moving the bag engaging means bodily with respect to the holding and supplying means, and means for moving the pivoted arms together upon movement of the bag engaging means toward the pivoted arms.

8. Means for supplying bag-like receptacles comprising a pair of pivoted arms normally urged apart and adapted to have bag-like receptacles drawn thereover, holding means for the receptacles, a frame for transferring the receptacles from the supplying means to the holding means, a plurality of shafts journaled on the frame, a plurality of needles on each shaft, means for moving the needles toward and away from each other, means for moving the shafts bodily with respect to the frame, and means for moving the pivoted arms together upon movement of the needles toward the pivoted arms.

9. Means for supplying bag-like receptacles, a rotatable table, a plurality of pairs of fingers on the table, one finger of each pair being fixedly mounted on the table and the other fingers of the respective pairs movably mounted thereon, means to urge the fingers normally apart, a frame for transferring receptacles from the supplying means to the fingers, means to move the fingers together when the frame moves a receptacle toward the same, presser feet upon opposite sides of the fingers when positioned to receive a receptacle, and means to move the presser feet against the fingers when a receptacle is placed thereover and away from the fingers prior to subsequent movement of the table.

10. Means for supplying bag-like receptacles, a rotatable table, means to impart a step by step motion to the table, a plurality of pairs of fingers on the table, one finger of each pair being fixedly mounted on the table and the other fingers of the respective pairs movably mounted thereon, means to urge the fingers normally apart, a pivoted frame movable into alignment with the supplying means and fingers, receptacle engaging means on the frame, means to move the receptacle engaging means toward and away from the said supplying means and fingers, means to move the fingers together when the receptacle engaging means moves toward the fingers, and means to hold the table stationary while the receptacle engaging means moves toward the fingers.

11. Means for supplying bag-like receptacles, a rotatable table, means to impart a step by step motion to the table, a plurality of pairs of fingers on the table, one finger of each pair being fixedly mounted on the table and the other fingers of the respective pairs movably mounted thereon, means to urge the fingers normally apart, a pivoted frame movable into alignment with the supplying means and fingers, receptacle engaging means on the frame, means to move the receptacle engaging means toward and away from the said supplying means and fingers, means to move the fingers together when the receptacle engaging means moves toward the fingers, means to hold the table stationary while the receptacle engaging means moves toward the fingers, presser feet to engage the sides of the fingers, and means to move the presser feet against the fingers after the receptacle engaging means has moved toward the fingers and away from the fingers after the receptacle engaging means has moved away from the fingers.

LOUIS HIRSCHHORN.
HANS IRMSCHER.